July 3, 1951 A. T. WATSON 2,559,239
SPRING SUSPENSION ASSEMBLY
Filed March 22, 1948 4 Sheets-Sheet 1
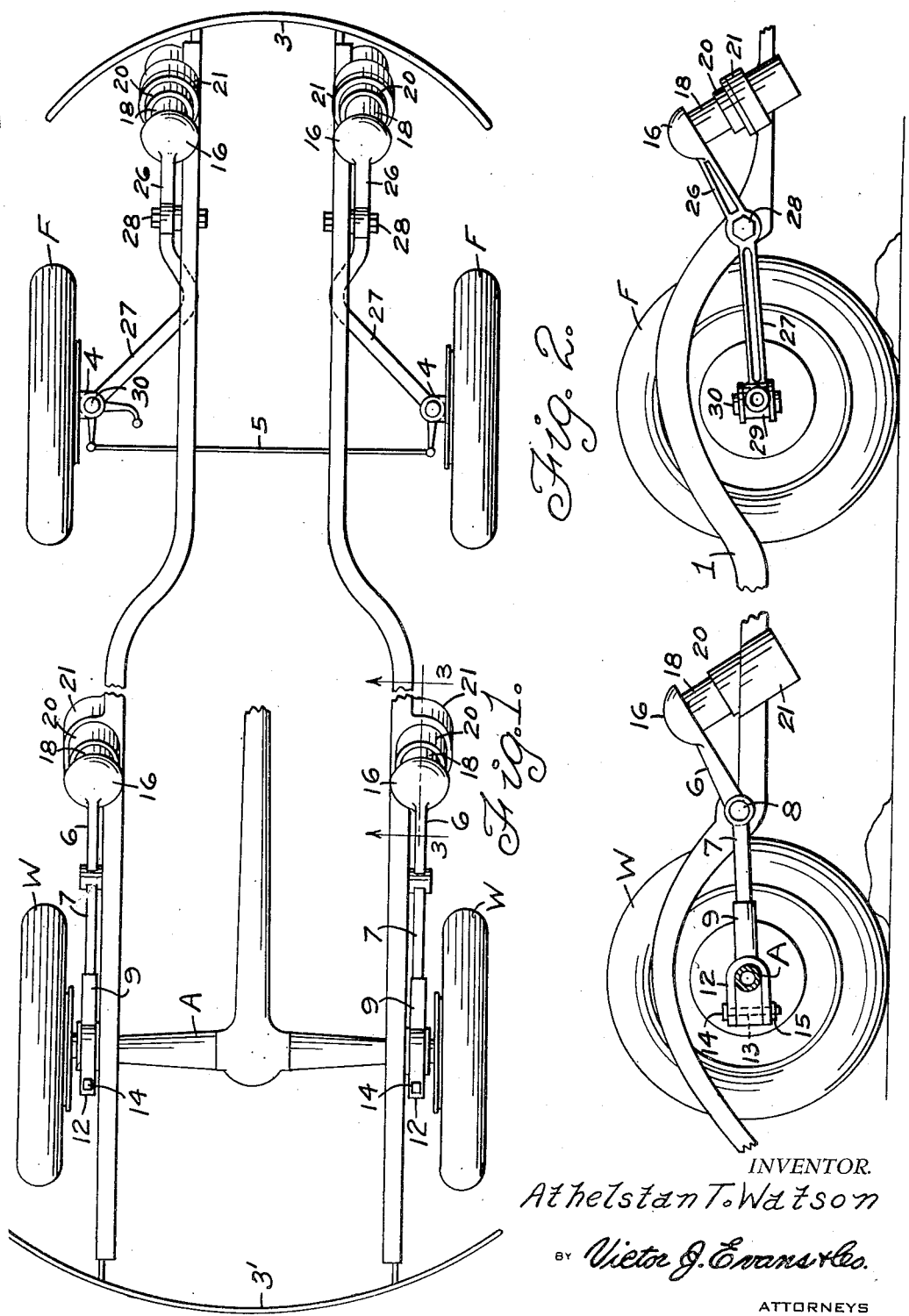
INVENTOR.
Athelstan T. Watson
BY Victor J. Evans & Co.
ATTORNEYS July 3, 1951  A. T. WATSON  2,559,239
SPRING SUSPENSION ASSEMBLY
Filed March 22, 1948  4 Sheets-Sheet 2
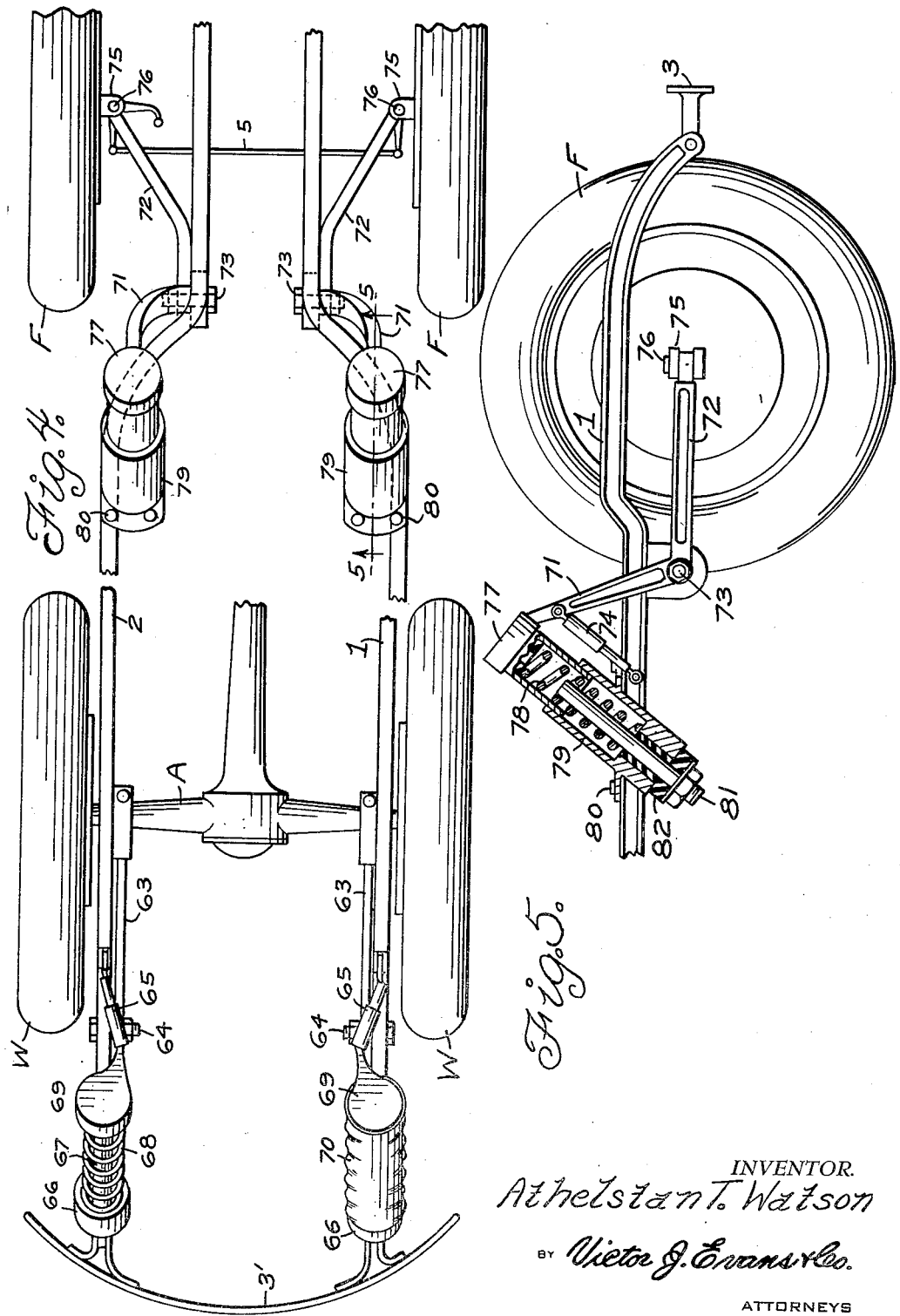
INVENTOR.
Athelstan T. Watson
BY Victor J. Evans & Co.
ATTORNEYS July 3, 1951  A. T. WATSON  2,559,239
SPRING SUSPENSION ASSEMBLY
Filed March 22, 1948  4 Sheets-Sheet 3
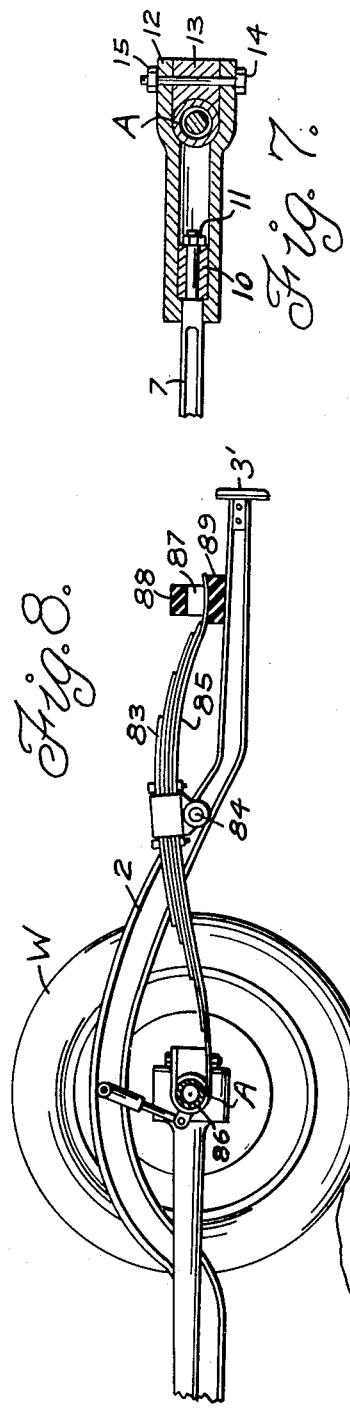
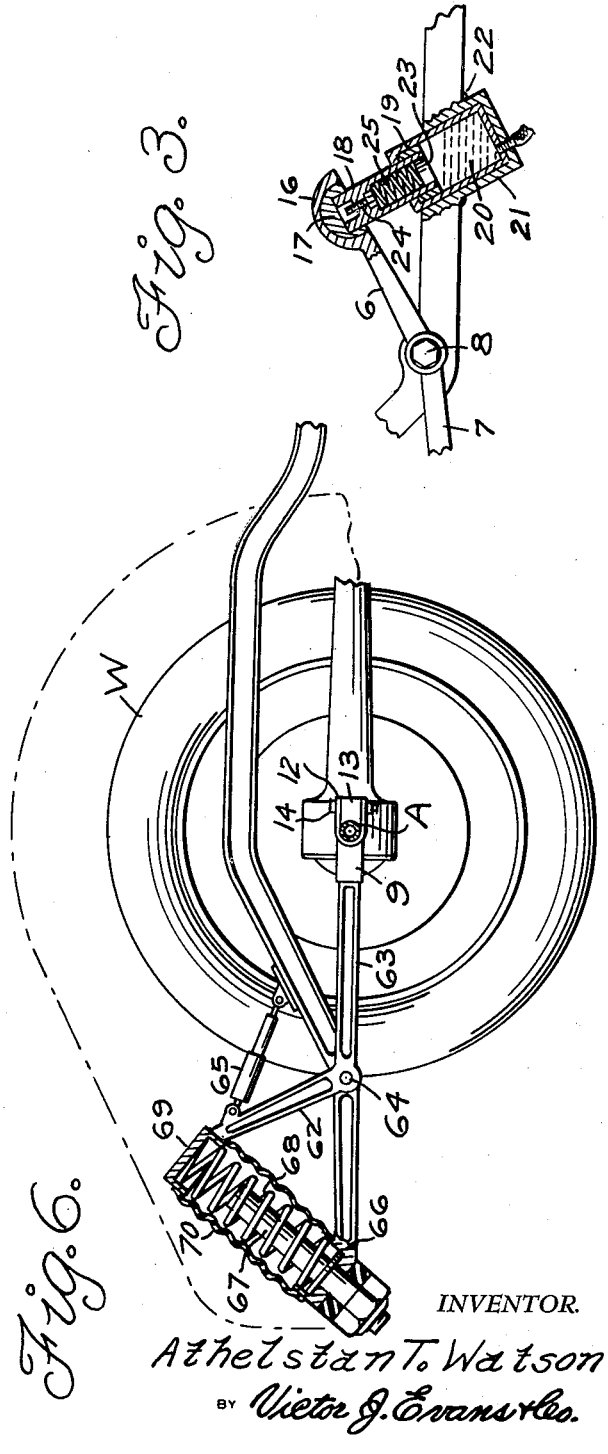
INVENTOR.
Athelstan T. Watson
BY Victor J. Evans & Co.
ATTORNEYS

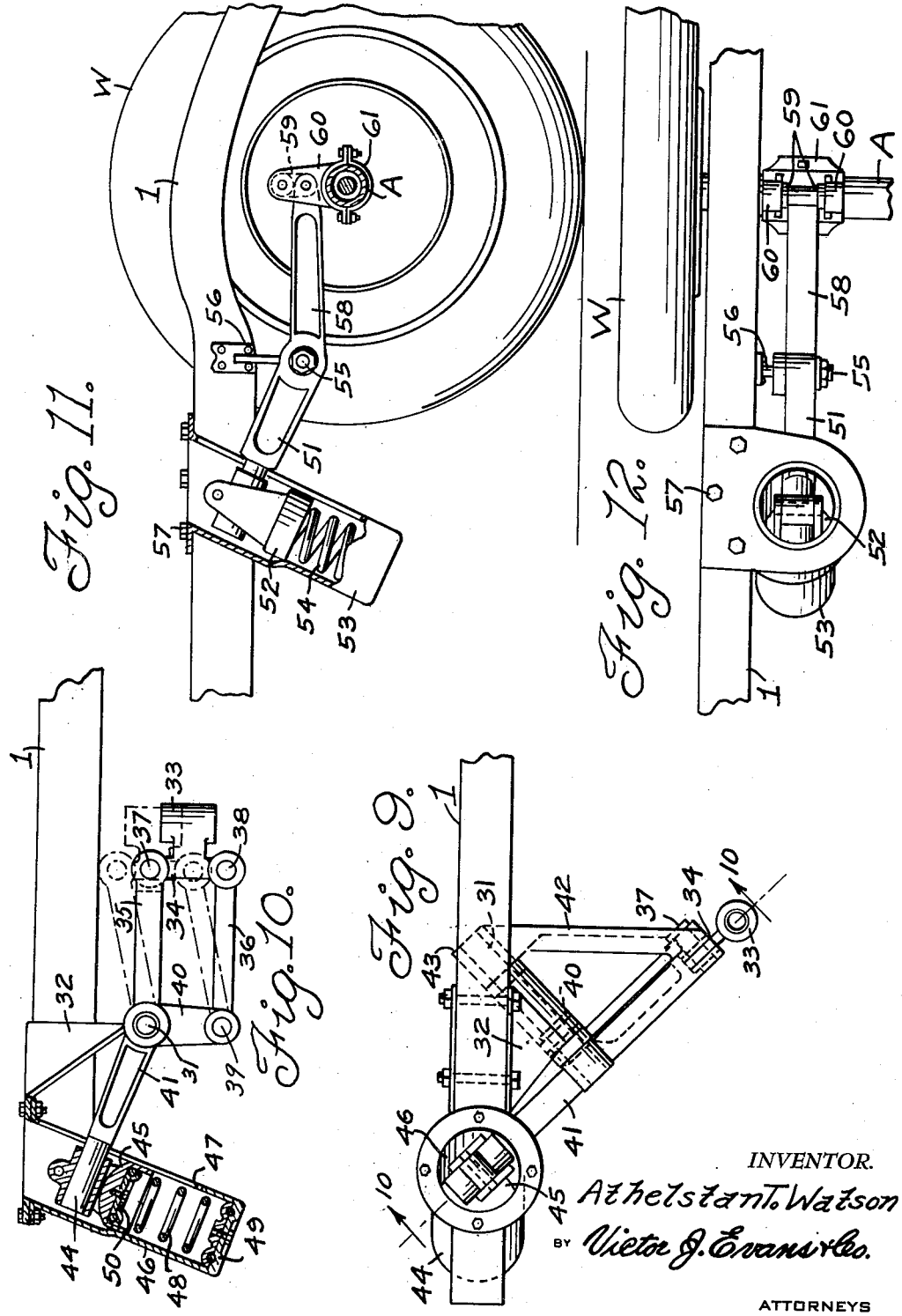

Patented July 3, 1951

2,559,239

UNITED STATES PATENT OFFICE 2,559,239

SPRING SUSPENSION ASSEMBLY

Athelstan T. Watson, Estado Zulia, Venezuela

Application March 22, 1948, Serial No. 16,336

2 Claims. (Cl. 267—15)

My present invention relates to spring devices as applied to the chassis or frame of an automotive vehicle, and more specifically to a bi-action spring suspension for motor vehicles, of the lever operated type and combined with the four wheel-mounts of the vehicle, with the chassis located above the front and rear axles of the vehicle, and the levers fulcrumed each between a wheel and the chassis-support of the lever, whereby the chassis acts as a neutral member in absorbing shocks and vibrations. In this novel combination and arrangement of the resilient suspension members or units of the vehicle, when a bump, or a depression, is encountered in the roadway, the chassis being hinged on the four fulcrums of the levers is compressed or released by the two contrary forces of the suspension acting between a wheel and a resilient suspension or support of the chassis.

At the rear of the vehicle a pair of spring suspension units for the shock-absorbing chassis or frame are anchored to the rear axle housing of the vehicle to provide a double swivel joint for the respective levers, in order that one rear wheel may hit a bump in the road and rise, while the opposite rear wheel continues in a level plane. At the front of the vehicle, the two levers are fulcrumed on the chassis and, preferably, swiveled on the steering knuckles of the front wheels, to co-act with the front wheels in their required movements.

A minimum number of standardized parts are included in each spring suspension unit, and these parts may be assembled with convenience, and the units may be installed with ease, to constitute smooth-working structures that readily absorb shocks and vibrations before such shocks and vibrations can reach the body of the vehicle and its occupants.

The invention consists in certain novel features of construction and combinations and arrangements of parts as will hereinafter be described and more particularly set forth in the appended claims.

In the accompanying drawings I have illustrated complete examples of physical embodiments of my invention wherein the parts are combined and arranged in accord with modes I have devised for the practical application of the principles of my invention. It will, however, be understood that other changes and alterations are contemplated and may be made in these exemplifying drawings and structures, within the scope of my claims, without departing from the principles of the invention.

Figure 1 is a plan view, broken for convenience of illustration, showing the wheels and chassis of an automotive vehicle equipped with the spring suspension appliances of my invention located in front of the respective wheels; and Figure 2 is a view in elevation of this structure, with parts in section.

Figure 3 is a sectional detail view, as at line 3—3 of Fig. 1 showing one of the combined spring and fluid units.

Figure 4 is a plan view similar to Fig. 1, but showing the spring suspension units at the rear of the respective wheels; and Figure 5 is a sectional detail view at line 5—5 of Fig. 4.

Figure 6 shows, partly in section, one of the rear suspension units of Fig. 5 employing a helical spring.

Figure 7 is a detail sectional view showing an end of a lever anchored to a rear axle housing by a double swivel joint.

Figure 8 is a view in elevation, and partly in section, showing a leaf-spring employed in the suspension unit at the rear of a rear wheel.

Figure 9 is a top plan view of a spring suspension for a front wheel; and Figure 10 is a sectional view at line 10—10 of Fig. 9.

Figures 11 and 12 are respectively a side elevation partly in section of a front suspension for a rear wheel; and Figure 12 is a top plan view of this structure.

In order that the general arrangement and utility of parts may readily be understood I have shown conventional parts of an automobile including the front wheels F, F and the rear wheels W, W, together with the rear axle housing A. The chassis or frame is made up of the right and left hand channel bars 1 and 2 with their arches over the axes of the respective pairs of wheels; a front bumper 3 and a rear bumper 3'; and the front wheels are equipped with the usual swivel joints or steering knuckles 4, and cross bar 5.

In Figs. 1 and 2 where the spring suspension units are located in front of the respective wheels F, F, and W, W, the two rear units each includes a suspension lever having a hub with a pressure arm 6 and a substantially horizontally disposed arm 7 and fulcrumed through the hub thereof on a ball bearing 8 mounted on the chassis bar, in front of the rear wheel. In Fig. 7 it will be seen that the rear arm 7 of the lever terminates in a swiveled and shackled connection with the rear axle housing A, and this connection includes a sleeve 9 having retained therein a slide head 10 fixed on the reduced end of arm 7 by nut 11 and capable of slight telescopic movement. The sleeve terminates in a U-shaped yoke 12, and a bearing block 13 for the axle housing A is mounted in the yoke, the joint being fastened by bolt 14 passing through the yoke and bearing block and a lock nut 15.

In Fig. 3 it will be seen that the front arm 6 of the suspension lever terminates in a cap 16 having a hemispherical seat that is swiveled on the complementary head 17 of a plunger or tubular bar 18 that is fitted with an exterior piston ring 19 reciprocable in a cylinder 20 forming a fluid chamber, which offers hydraulic resistance to the plunger. The fluid casing 20 is rigidly mounted in a cylindrical housing or cup 21 that is welded, as at 22 to the chassis bar. The tubular bar 18 forms a housing for a resilient supported head 23, and this head, which forms the end of the piston or plunger is factory adjusted, is provided with an adjusting bolt 24 with a spring 25 around the bolt for absorbing pressure within the fluid chamber 20 as the tubular bar or plunger 18 is forced downward into the chamber by the arm 6 when the wheel W passes over a bump as illustrated in Fig. 2. The front wheel suspensions, as shown in Figures 1 and 2 include right and left hand suspension levers, each having a front arm 26 and a rear arm 27 which is shaped as shown in Fig. 1 to compensate for the formation of the forward end of the chassis and mounting and steering elements of the vehicle. The levers are fulcrumed on the chassis through bearing hubs 28 and the rear ends of the arms 27 are provided with vertically disposed hubs 29 through which the arms are pivotally attached to the steering knuckles of the front wheels by king pins 30.

In the design shown in Figs. 9 and 10 the shock absorbing unit is pivotally mounted on a diagonally positioned shaft 31 that is suspended from the chassis by a bracket 32 and a hub 33, through which the device is attached to the steering knuckles or axle of the vehicle, is carried by a vertically disposed link 34 which is pivotally mounted in the ends of parallel arms 35 and 36 by pins 37 and 38, and the arms are pivotally supported in the bracket 32 with the upper arm 35 pivoted on the shaft 31, and the lower arm 36 pivoted on a pin 39 in the lower end of an arm 40 extending downward from the bracket 32. This provides a parallelogram which holds the link 34 substantially vertical or parallel to the arm 40 in all positions as indicated by the dotted lines in Fig. 10. The upper arm 35 is supported with a diagonal brace 42 which has a hub 43 at the end by which it is pivoted on the shaft 31.

The outer end of the lever 41 is provided with a cylindrical section 44 by which it is journaled in a piston 45 in a cylinder 46 which has a slot 47 in one side through which the lever 41 extends, and the piston rides on the upper end of a spring 48, the lower end of which is held on the end 49 of the cylinder. The cylinder 46 is carried by the chassis through the bracket 32, and the under surface of the piston 45 may be provided with a cup-shaped washer 50.

In the form of the invention illustrated in Figs. 11 and 12, a lever arm 51 is operatively connected to a spring suspension member similar to that shown in Fig. 10 with the end of the arm 51 mounted in a piston 52 in a cylinder 53 with a spring 54 therein, and the arm is pivotally mounted on the chassis by a shaft 55 which is journaled in a bracket 56. The cylinder 53 is mounted on the chassis by bolts 57, as shown. The opposite end 58, of the lever 51 is suspended by a link 59 from an upright arm 60 of a shackle 61 that is rigidly mounted on the axle housing A.

In Figs. 4, 5 and 6 the spring suspension elements are mounted at the rear of the respective wheels, and the suspension levers are fulcrumed on the chassis between the suspension springs and the anchors for the levers. In Fig. 6, the suspension units for the rear wheels each includes levers 62 and 63 that are fulcrumed by pins 64 on the chassis, and a conventional shock absorber 65 may be used in these installations, if desired. At the rear end of the chassis is a head 66 in which a bolt 67 is secured and a spring 68 is provided around the bolt with a cap 69 on the end of the lever 62 bearing against the upper end of the spring. The spring is enclosed in a flexible casing 70, the ends of which are held on the head 66 and cap 69, as shown.

The corresponding units of the front wheels are provided as shown in Fig. 5, with levers 71 and 72 fulcrumed on pins 73 of the chassis and these may be provided with conventional shock absorbers 74. The forward ends of the levers 72 are mounted with swivel connections in steering knuckles 75 by king pins 76, and the rear arm or lever 71 is formed with a cap 77 similar to the cap 69, which rests on the upper end of a spring 78 in a telescoping housing 79 that is mounted on the chassis by bolts 80. A bolt 81 extends through the spring and housing therefor and a resilient cushion 82 is provided on the lower end of the bolt. The cushion engages the lower end of the spring housing 79, and the spring absorbs the shock transmitted thereto by the cap 77 of the lever 71.

In the modification of the spring suspension illustrated in Fig. 8, the shock absorbing elements are positioned at the rear of the rear wheels W, and a multi-leaf spring 83 is pivotally mounted on the chassis by a bolt 84 with the main or base leaf 85 of the spring mounted in a shackle 86 on the rear axle housing with a swivel connection. The opposite end of the leaf 85 is slidably held in a slot 87 between two fixed resilient pads 88 and 89 which are mounted on the upper surface of the side bars of the chassis in any suitable manner.

In these various illustrated installations of the spring suspension units, the suspension levers are fulcrumed in such manner on the chassis and anchored at their opposite ends, to support the chassis at normal height above the ground. When bringing the vehicle or automobile to a sudden stop, the momentum or forward motion of the body of the automobile is absorbed by the suspension units through the chassis, thereby eliminating transmission of violent shocks and movements to the interior of the vehicle body, and permitting the body and chassis to again settle to the normal position.

The forces of impact received through the wheels as they strike a bump, or drop into a depression in the road, are transmitted through the fulcrumed levers and their resilient connections with the chassis, and then these forces are equalized and applied, simultaneously, to the upper and lower sides of the chassis as it absorbs these forces. In this manner the chassis acts as a neutralizer between the opposed forces and establishes and maintains equilibrium for the vehicle body when the wheels hit an obstruction or depression.

Having thus fully described my invention, what I claim as new and desire to secure by Letters Patent is:

1. In a vehicle wheel suspension assembly, the combination which comprises a vehicle frame, a lever having a bearing hub with a substantially horizontally disposed arm and an upwardly extended angularly disposed pressure arm extended therefrom, means pivotally mounting the lever through the bearing hub thereof on the vehicle frame, wheel mounting means on the outer end of the horizontally disposed arm, a cylindrical housing having a fluid therein mounted on the frame and positioned with the axis thereof perpendicular to the said angularly disposed pressure arm of the lever, a piston in said cylindrical housing having an upwardly extend piston rod extended from the upper end of the housing, and means connecting the upper end of the piston rod to the angularly disposed pressure arm of the lever whereby upward movement of the wheel mounting actuates the angularly disposed arm of the lever downwardly against the cushioning element and the cushioning element urges the said wheel mounting downwardly when shock or excessive load on a wheel carried by the wheel mounting is released.

2. In a vehicle wheel suspension assembly, the combination which comprises a vehicle frame, a lever having a bearing hub with a substantially horizontally disposed arm and an upwardly extended angularly disposed pressure arm extended therefrom, means pivotally mounting the lever through the bearing hub thereof on the vehicle frame, wheel mounting means on the outer end of the horizontally disposed arm, a cylindrical housing having a fluid therein mounted on the frame and positioned with the axis thereof perpendicular to the said angularly disposed pressure arm of the lever, a piston in said cylindrical housing having an upwardly extended piston rod extended from the upper end of the housing, said piston having a bore extended inwardly from the face thereof, a spring positioned in the bore of the piston, a resilient adjustably held head positioned in the bore of the piston and coacting with the spring therein and means connecting the upper end of the piston rod to the angularly disposed pressure arm of the lever whereby upward movement of the wheel mounting actuates the angularly disposed arm of the lever downwardly against the cushioning element and the cushioning element urges the said wheel mounting downwardly when shock or excessive load on a wheel carried by the wheel mounting is released.

ATHELSTAN T. WATSON.

REFERENCES CITED

The following references are of record in the file of this patent:

UNITED STATES PATENTS

| Number | Name | Date |
|---|---|---|
| 892,051 | Hewitt | June 30, 1908 |
| 1,073,330 | Bushby | Sept. 16, 1913 |
| 1,316,369 | Laisne | Sept. 16, 1919 |
| 1,584,836 | Bowers | May 18, 1926 |
| 1,757,839 | Keck | May 6, 1930 |
| 1,946,769 | Stanton | Feb. 13, 1934 |
| 2,342,381 | Thornhill | Feb. 22, 1944 |

FOREIGN PATENTS

| Number | Country | Date |
|---|---|---|
| 41,000 | France | Sept. 17, 1932 |